March 30, 1937.  C. E. McMAHON  2,075,449
VEHICLE BODY
Filed June 27, 1935　　2 Sheets-Sheet 1

Inventor
C. E. McMahon
By Cushman Darby Cushman
Attorneys

March 30, 1937. C. E. McMAHON 2,075,449
VEHICLE BODY
Filed June 27, 1935 2 Sheets-Sheet 2

Inventor
C. E. McMahon
By Cushman Darby & Cushman
Attorneys

Patented Mar. 30, 1937

2,075,449

UNITED STATES PATENT OFFICE 2,075,449

VEHICLE BODY

Cecil E. McMahon, Kansas City, Kans.

Application June 27, 1935, Serial No. 28,736

8 Claims. (Cl. 296—24)

The present invention relates to vehicle bodies and particularly to an arrangement wherein a vehicle body may be readily converted from a passenger type to a commercial or delivery type. In order that the invention may be fully understood, I have shown a practical embodiment thereof by way of example in the accompanying drawings. The invention is contemplated herein as being applied to a closed body of the two door sedan type, but it will be understood that the invention may be applied to open cars or to closed cars of other body types.

Figure 1:
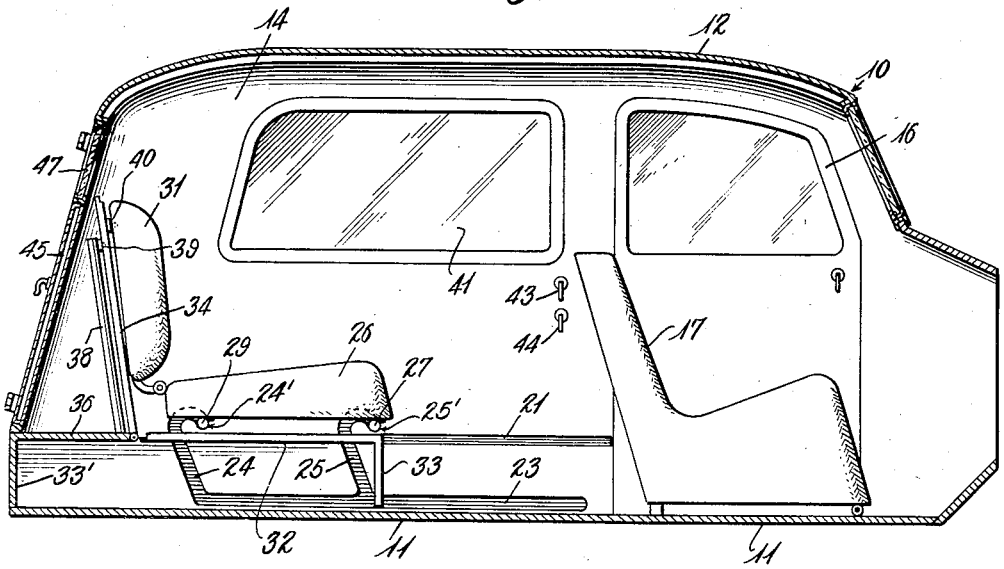
Figure 1 is a longitudinal section taken on a vertical plane, of a vehicle body with the present invention applied thereto.

Referring to the drawings, the body generally indicated at 10 comprises a fixed floor 11, a top 12, side walls 13 and 14 and a rear wall 15. The forward portions of the side walls are provided with doors as at 16 which give access to the driver's seat 17. This seat may be movable in the well known manner in order to give access to the rear portion of the body when the car is being used for passenger carrying.

Figure 3:
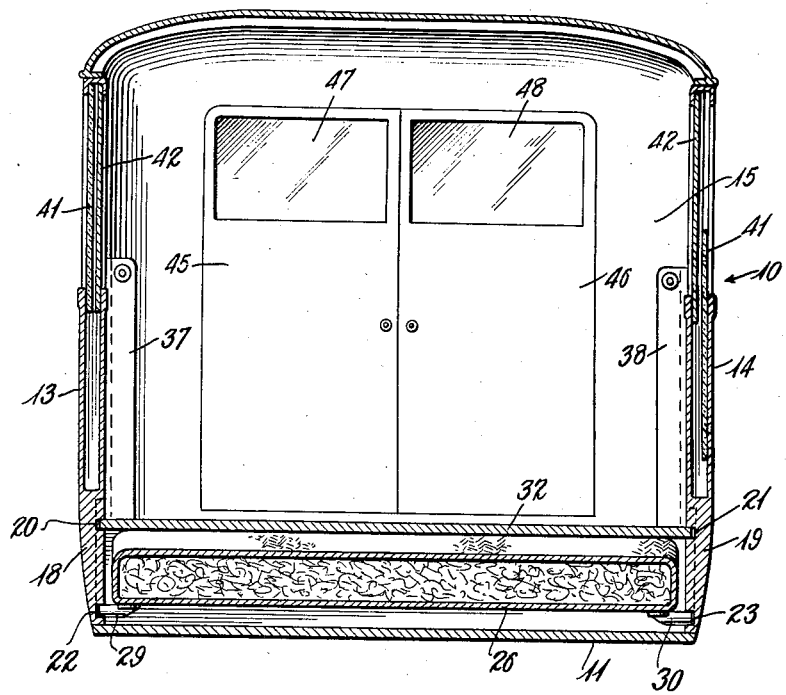
Figure 3 is a section substantially on line 3—3 of Figure 2.
Figure 4:
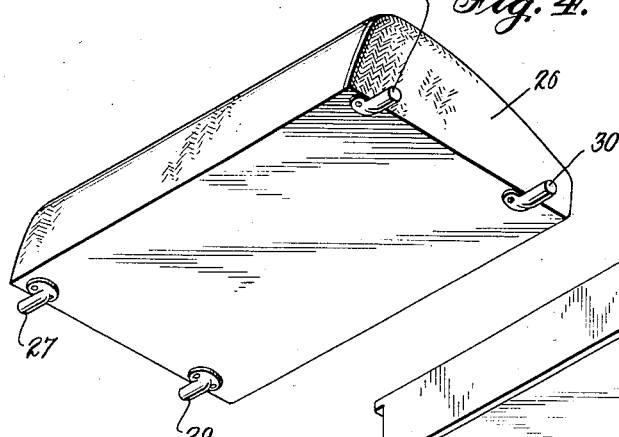
Figure 4 is a perspective view of a movable seat.
Figure 5:
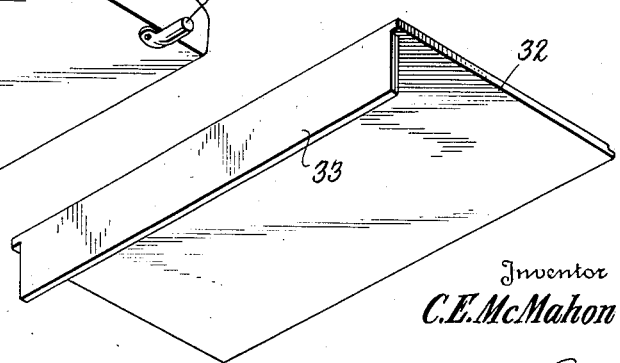
Figure 5 is a perspective view of a movable floor portion.

As most clearly shown in Figure 3, the side walls comprise the base boards or members 18 and 19 which are of considerable thickness and provided on their inner surfaces with the parallel top grooves 20 and 21 and the parallel bottom grooves 22 and 23. Each base board has a pair of parallel grooves as at 24 and 25 extending upwardly from its bottom groove and somewhat rearwardly inclined as here shown. The upper ends of grooves 24 and 25 lie above the plane of the upper grooves 20 and 21 and are hooked forwardly and downwardly. The end walls 24' and 25' of these hooked portions are upwardly faced.

A seat 26 has oppositely directed laterally projecting lugs 27, 28 and 29, 30 secured to its bottom, the lugs at each side being spaced from each other as the grooves 24 and 25. A back 31 is pivoted on a transverse axis to the rear edge of the seat 26 and is adapted to assume the operative position relative to the seat as shown in Figure 1 or the relatively collapsed position as shown in Figure 2.

Figure 2:
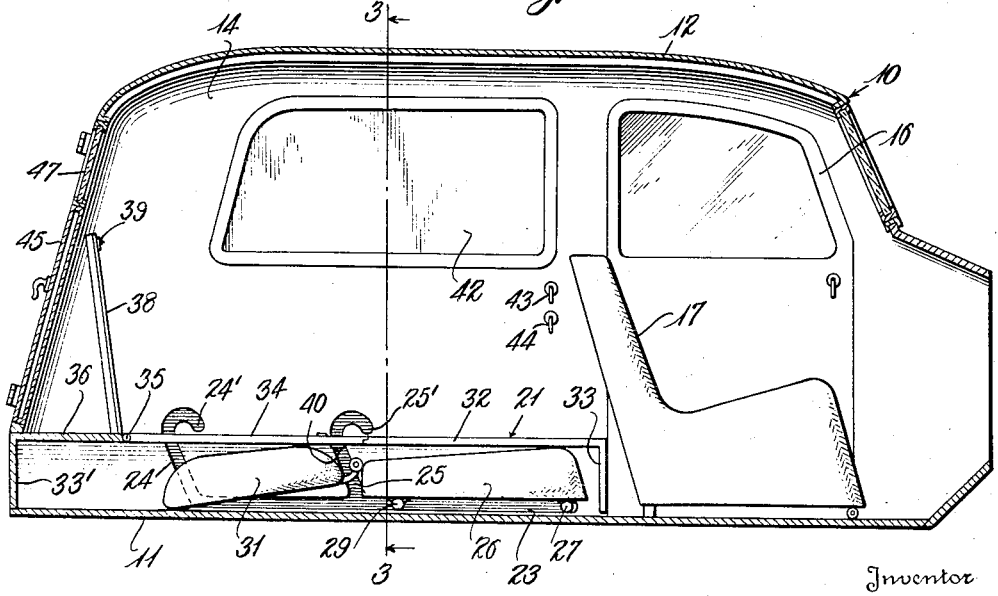
Figure 2 is a view similar to Figure 1 but with the parts in different arrangement.

The lugs 28 and 29 as shown in Figures 2 and 3 are engaged in the bottom groove 22, the lugs 28 and 30 being engaged in the bottom groove 23. Under these conditions the back may assume the horizontal position of Figure 2 wherein its rear edge rests on the floor 11. The seat 26, Figures 2 and 3, underlies a false floor panel 32 which is slidable in grooves 20 and 21 and has a fixed end panel or valance 33 which lies in front of the seat. A rear floor portion 34 is pivoted to the body side walls as at 35 and overlies the back 31, the front edge of portion 34 being supported by the rear edge of slide 32.

The front portions 32 and 34 in conjunction with the fixed portion 36 provide a uni-planar lading bottom when the car is to be used for commercial or delivery purposes. The space between the rear edge of floor portion 36 and the main floor 11 is closed by a panel 33'.

To convert the car for passenger service, the floor panel 34 is swung upwardly about its axis 35 to the position shown in Figure 1 wherein it lies against a pair of angles 37 and 38 which are secured to the body side walls, and may be fastened to the latter by means of snaps or the like as at 39. The back 31 may now be swung to substantially upright position and the seat 26 pulled rearwardly until the lugs 27, 30 come under the upwardly extending grooves as at 24 and 25. Hereupon the back and seat are lifted until the lugs come to the tops of the hooked portions of the grooves whereupon the seat is moved forward to bring the lugs on top of the supporting surfaces as at 24' and 25'. The seat is thus retained securely in upper position, the back resting against panel 34 and being preferably secured thereto by means such as snaps as at 40. With the seat in elevated position, panel 32 may be slid under it in the manner shown in Figure 1 so as to provide leg room in front of the seat.

The side walls are provided with window openings to the rear of the driver's seat, each of these openings being preferably closable by both a transparent glass closure 41 and a closure 42 of non-frangible material such as steel. These latter have their outer surfaces painted or decorated to present generally the same appearance as the outer surface of the body side walls. They thus give the car an improved appearance and serve to guard the glass closures when the car is being used commercially. Any suitable means such as the cranks 43 and 44 may be used for manipulating the double closures which, it will be understood, are separately operable. If desired, the closures 42 may be placed on the outside and in that case the glass closure will be lowered during commercial use of the car.

As above stated, the passenger compartment is accessible from the driver's compartment. For delivery purposes the rear wall 15 of the car is preferably provided with doors as at 45 and 46, these having rear vision windows 47 and 48.

It will be seen that according to the invention comfortable seating accommodations are provided, these being readily movable to inoperative position wherein they are fully protected by the lading flooring 32 and 34 as well as by the valance 33.

It will be understood that variations in the form and arrangement of parts may be made and accordingly I do not limit myself except as in the following claims.

I claim:

1. In a vehicle body, a floor portion shiftable longitudinally of the vehicle, and a seat shiftable longitudinally of the vehicle between relatively elevated and depressed positions, the seat being beneath said floor portion when in its depressed position, said floor portion being movable under said seat when the latter is in its elevated position, a back pivoted to said seat and adapted to assume a depressed position with said seat, and a further floor portion overlying said back when the latter is in depressed position.

2. In a vehicle body, a seat and a back pivoted to said seat, the seat and back being movable from a relatively elevated position wherein they are in operative relation to a relatively depressed position wherein they are both in horizontally extending position, means for housing said seat and back when they are in the last named position, said housing means providing a lading floor and comprising a hinged portion which is disposed behind said back when the seat and back are in operative relation.

3. In a vehicle body, a seat and a back pivoted to said seat, the seat and back being movable from a relatively elevated position wherein they are in operative relation to a relatively depressed position wherein they are both in horizontally extending position, means for housing said seat and back when they are in the last named position, said housing means providing a lading floor comprising a hinged portion which is disposed behind said back when the seat and back are in operative relation and a portion slidable under said seat when the seat and back are in operative relation.

4. In a vehicle, a body comprising a driver's station and a space therebehind, upright walls at the sides of said space, said walls having parallel grooves forming tracks with forward horizontal portions and rearward upward portions, the latter being hooked at their upper ends, a seat having laterally projecting portions engaged in said grooves, the seat being movable between relatively depressed forward and relatively elevated rearward positions as guided by said projecting portions in cooperation with said grooves, and a back hinged to said seat and in operative relation to the seat when the latter is in its rearward position, said back occupying a horizontal position when the seat is in its forward position.

5. In a vehicle, a body comprising a driver's station and a space therebehind, upright walls at the sides of said space, said walls having parallel grooves forming tracks with forward horizontal portions and rearward upward portions, the latter being hooked at their upper ends, a seat having laterally projecting portions engaged in said grooves, the seat being movable between relatively depressed forward and relatively elevated rearward positions as guided by said projecting portions in cooperation with said grooves, a back hinged to said seat and in operative relation to the seat when the latter is in its rearward position, said back occupying a horizontal position when the seat is in its forward position, and means for housing said seat and back when they are in the last named position, said housing means providing a lading floor.

6. In a vehicle, a body comprising a driver's station and a space therebehind, upright walls at the sides of said space, said walls having parallel grooves forming tracks with forward horizontal portions and rearward upward portions, the latter being hooked at their upper ends, a seat having laterally projecting portions engaged in said grooves, the seat being movable between relatively depressed forward and relatively elevated rearward positions as guided by said projecting portions in cooperation with said grooves, a back hinged to said seat and in operative relation to the seat when the latter is in its rearward position, said back occupying a horizontal position when the seat is in its forward position, means for housing said seat and back when they are in the last named position, said housing means providing a lading floor, and comprising a portion guided by means of grooves in said upright walls for movement beneath said seat when the latter is in its rearward position.

7. In a vehicle, a body comprising a driver's station and a space therebehind, upright walls at the sides of said space, said walls having parallel grooves forming tracks with forward horizontal portions and rearward upward portions, the latter being hooked at their upper ends, a seat having laterally projecting portions engaged in said grooves, the seat being movable between relatively depressed forward and relatively elevated rearward positions as guided by said projecting portions in cooperation with said grooves, a back hinged to said seat and in operative relation to the seat when the latter is in its rearward position, said back occupying a horizontal position when the seat is in its forward position, means for housing said seat and back when they are in the last named position, said housing means providing a lading floor, comprising a portion guided by means of grooves in said upright walls for movement beneath said seat when the latter is in its rearward position, and comprising also a portion hinged between said upright walls and disposed in upwardly extending position behind said back when the seat and back are in operative relation.

8. In a vehicle body, a seat and a back pivoted to the seat, means for supporting the seat and back in elevated operative position or in a lowered position wherein the back as well as the seat is substantially horizontal, and a lading floor disposable above the seat and back when they are in said lowered position, said floor comprising a pivoted portion swingable upwardly to a position behind the back when the latter is in operative position and also a portion slidable under the seat when the latter is in operative position.

CECIL E. McMAHON.